US011368280B2

(12) United States Patent
Al Badawi et al.

(10) Patent No.: US 11,368,280 B2
(45) Date of Patent: Jun. 21, 2022

(54) HOMOMORPHIC ENCRYPTION USING DISCRETE GALOIS TRANSFORMS

(71) Applicant: Agency for Science, Technology and Research, Singapore (SG)

(72) Inventors: Ahmad Al Badawi, Singapore (SG); Khin Mi Mi Aung, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 321 days.

(21) Appl. No.: 16/634,570

(22) PCT Filed: Jul. 24, 2018

(86) PCT No.: PCT/SG2018/050366
§ 371 (c)(1),
(2) Date: Jan. 27, 2020

(87) PCT Pub. No.: WO2019/022665
PCT Pub. Date: Jan. 31, 2019

(65) Prior Publication Data
US 2022/0085970 A1    Mar. 17, 2022

(30) Foreign Application Priority Data

Jul. 28, 2017    (SG) .......................... 10201706159V

(51) Int. Cl.
*H04L 29/06*    (2006.01)
*H04L 9/00*    (2022.01)
(Continued)

(52) U.S. Cl.
CPC .............. *H04L 9/008* (2013.01); *G06F 7/724* (2013.01); *H04L 9/3093* (2013.01)

(58) Field of Classification Search
None
See application file for complete search history.

(56) References Cited

U.S. PATENT DOCUMENTS

2002/0027986 A1\* 3/2002 Brekne ................. H04L 9/3073
                                                              380/28
2013/0216044 A1\* 8/2013 Gentry ............... H04L 63/0442
                                                              380/277

(Continued)

OTHER PUBLICATIONS

Yarkm Doröz, Yin Hu, and Berk Sunar. 2016. Homomorphic AES evaluation using the modified LTV scheme. Des. Codes Cryptography 80, 2 (Aug. 2016), 333-358. DOI:https://doi.org/10.1007/s10623-015-0095-1 (Year: 2016).\*

(Continued)

*Primary Examiner* — Jeffery L Williams
(74) *Attorney, Agent, or Firm* — Womble Bond Dickinson (US) LLP

(57) ABSTRACT

Efficient polynomial multiplication for Accelerated Fully Homomorphic Encryption (FHE). An efficient method for large integer and polynomial multiplication in a ring using negacyclic convolution and discrete Galois transform with arbitrary primes is described. The method is adapted to work with arbitrary primes that support Gaussian arithmetic. Dealing with non-Gaussian primes gives rise to another problem of how to find primitive roots of unity and of (i). An efficient solution to find those roots of interest is provided.

20 Claims, 5 Drawing Sheets

(51) Int. Cl.
*G06F 7/72* (2006.01)
*H04L 9/30* (2006.01)

(56) References Cited

U.S. PATENT DOCUMENTS

| | | | |
|---|---|---|---|
| 2016/0164670 A1* | 6/2016 | Gentry | H04L 9/0618 380/28 |
| 2016/0164671 A1* | 6/2016 | Gentry | H04L 9/0618 380/28 |
| 2016/0164676 A1* | 6/2016 | Gentry | H04L 9/0838 380/30 |
| 2016/0239463 A1* | 8/2016 | Song | G06F 17/142 |

OTHER PUBLICATIONS

Alves, Pedro Geraldo M. R., Jheyne N. Ortiz and Diego F. Aranha. "Faster Homomorphic Encryption over GPGPUs via hierarchical DGT." IACR Cryptol. ePrint Arch. (2020). (Year: 2020).*

Al Badawi, Ahmad & Veeravalli, Bharadwaj & Mun, Chan & Aung, Khin. (2018). High-Performance FV Somewhat Homomorphic Encryption on GPUs: An Implementation using CUDA. IACR Transactions on Cryptographic Hardware and Embedded Systems. 70-95. 10.46586/tches.v2018.i2.70-95. (Year: 2018).*

Al Badawi A., Veeravalli B., Aung K.M.M. (2019) Efficient Polynomial Multiplication via Modified Discrete Galois Transform and Negacyclic Convolution. In: Arai K., KapoorS., Bhatia R. (eds) Advances in Information and Communication Networks. FICC2018. (Year: 2018).*

Craig Gentry. 2009. Fully homomorphic encryption using ideal lattices. In Proceedings of the forty-first annual ACM symposium on Theory of computing (STOC '09). Association for Computing Machinery, New York, NY, USA, 169-178. (Year: 2009).*

David Harvey, Joris van der Hoeven, Grégoire Lecerf. Faster polynomial multiplication over finite fields. 2014. ffhal-01022757v2f (Year: 2015).*

Cooley, et al., "An Algorithm for the Machine Calculation of Complex Fourier Series," IBM Watson Research Center, Aug. 17, 1964, 5 pages, Bell Telephone Laboratories, New Jersey, USA.

Crandall, et al., "Prime Numbers: A Computational Perspective," 2005, 604 pages, Second Edition, Springer Science & Business Media, USA.

Crandall, et al., "Integer convolution via split-radix fast Galois transform," Center for Advanced Computation, Feb. 1999, 4 pages, Reed College.

Creutzburg, et al., "Parameter Determination for Complex Number-Theoretic Transforms Using Cyclotomic Polynomials," Mathematics of Computation, Jan. 1989, pp. 189-200, vol. 52, No. 185, American Mathematical Society.

Fagin, et al., Discrete Weighted Transforms and Large-Integer Arithmetic, Mathematics of Computation, Jan. 1994, pp. 305-324, vol. 62, No. 205, American Mathematical Society.

Frigo, et al., The Design and Implementation of FFTW3, Proc. IEEE, 2005, pp. 216-231, vol. 93, No. 2, IEEE.

Gentleman, W. M., "Fast Fourier Transforms—For Fun and Profit," Proceedings—Fall Joint Computer Conference, 1966, 18 pages., New Jersey, USA.

Hart, et al., "FLINT, Fast Library for Number Theory," Aug. 13, 2015, 671 pages, Version 2.5.2.

Karatsuba, et al., "Multiplication of Multidigit Numbers on Automata," Cybergenetics and Control Theory, Jan. 1963, 3 pages, vol. 7, No. 7, Soviet Physics—Doklady.

Shoup, V., "NTL: A library for doing number theory," 2001, vol. 240 <https://www.shoup.net/ntl/>.

Solinas, J., "Generalized Mersenne Numbers," National Security Agency, Jan.-Jun. 1999, p. 23, CACR Visitor.

Winkler, F., "Polynomial Algorithms in Computer Algebra," Research Institute for Symbolic Computation, 1996, 284 pages, Springer-Verlag Wien.

* cited by examiner

HOMOMORPHIC ENCRYPTION USING DISCRETE GALOIS TRANSFORMS

PRIORITY CLAIM

This patent application is a U.S. National Phase Application under 35 U.S.C. § 371 of International Application No. PCT/SG2018/050366, filed on 24 Jul. 2018, entitled MULTIPLICATION METHODS, NON-TRANSITORY COMPUTER-READABLE MEDIA, AND MULTIPLICATION DEVICES, which claims the benefit of priority to Singapore patent application 10201706159V, filed 28 Jul. 2017.

TECHNICAL FIELD

The following discloses multiplication methods, non-transitory computer-readable media, and multiplication devices.

BACKGROUND ART

Various scientific and technical fields deal with large integer numbers and polynomial multiplication in a ring, such as computer algebra, coding theory, and cryptography. In particular in data encryption, it may be desired to perform computation on the encrypted data without having to decrypt the data before performing the computation and then re-encrypting the computation result after performing the computation.

However, present methods that provide for the computation on encrypted data are inefficient. As such, there is a desire for more efficient methods and devices.

SUMMARY OF INVENTION

In accordance with a first aspect, there is provided a multiplication method comprising: providing a prime number p, a first polynomial and a second polynomial; determining a first discrete Galois transform based on the first polynomial and the prime number; determining a second discrete Galois transform based on the second polynomial and the prime number; determining a point-wise product of the first discrete Galois transform and the second discrete Galois transform; determining an inverse discrete Galois transform based on the point-wise product; and determining a polynomial product of the first polynomial and the second polynomial based on the inverse discrete Galois transform.

In accordance with a second aspect, there is provided a non-transitory computer-readable medium, comprising instructions which, when executed by a processor, make the processor perform: providing a prime number p, a first polynomial and a second polynomial; determining a first discrete Galois transform based on the first polynomial and the prime number; determining a second discrete Galois transform based on the second polynomial and the prime number; determining a point-wise product of the first discrete Galois transform and the second discrete Galois transform; determining an inverse discrete Galois transform based on the point-wise product; and determining a polynomial product of the first polynomial and the second polynomial based on the inverse discrete Galois transform.

In accordance with a third aspect, there is provided a multiplication device comprising: a prime number providing circuit configured to provide a prime number p, a first polynomial and a second polynomial; a first discrete Galois transform determination circuit configured to determine a first discrete Galois transform based on the first polynomial and the prime number; a second discrete Galois transform determination circuit configured to determine a second discrete Galois transform based on the second polynomial and the prime number; a point-wise product determination circuit configured to determine a point-wise product of the first discrete Galois transform and the second discrete Galois transform; an inverse discrete Galois transform determination circuit configured to determine an inverse discrete Galois transform based on the point-wise product; and a polynomial product determination circuit configured to determine a polynomial product of the first polynomial and the second polynomial based on the inverse discrete Galois transform.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the preferred embodiments to disclose methods and devices which may be used in various scientific and technical fields dealing with large integer numbers and polynomial multiplication in a ring, such as computer algebra, coding theory, cryptography, fixed point arithmetic, number theory, abstract algebra and signal processing. In particular in data encryption, the methods and devices may efficiently perform computation on the encrypted data without having to decrypt the data before performing the computation and then re-encrypting the computation result after performing the computation. Encryption that allows this computation on ciphertexts (in other words: on encrypted data) may be referred to as homomorphic encryption. In an embodiment, a new class of cryptographic solutions based on ring-learning with errors problem is described.

According to various embodiments, efficient polynomial multiplication for Accelerated Fully Homomorphic Encryption (FHE) may be provided. According to various embodiments, an efficient method for large integer and polynomial multiplication in a ring using negacyclic convolution and discrete Galois transform with arbitrary primes is provided. The method is adapted to work with arbitrary primes, not only primes that support Gaussian arithmetic. Dealing with non-Gaussian primes gives rise to another problem of how to find primitive roots of unity and of (i). According to various embodiments, an efficient solution to find those roots of interest is provided.

Figure 1:
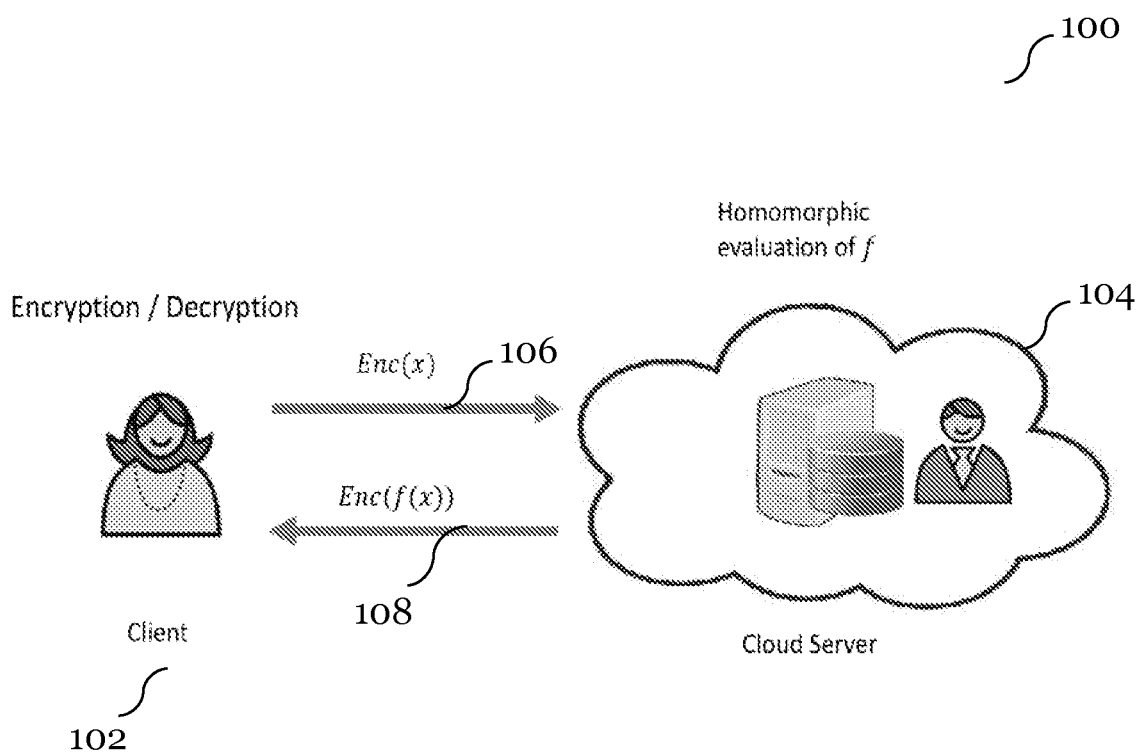
FIG. 1 shows an illustration of an application in cloud computing of methods and devices according to various embodiments.

FIG. 1 shows an illustration 100 of an application in cloud computing of methods and devices according to various embodiments. A client 102 may be able to encrypt data x, and may send the encrypted data enc(x) 106 to a cloud server 104. The cloud server 104 may provide a homomorphic evaluation of a function f (in other words: the cloud server 104 may perform computation on the data x that has been provided from client 102 in an encrypted form enc(x), without decrypting the encrypted data), and may provide the result enc(f(x)) 108 to the client 102. The client 102 may then decrypt the encrypted result enc(f(x)) to obtain f(x), which is the computation result of function f with input x. However, the cloud server 104, in order to provide the encrypted result, would not need to be in possession of the unencrypted input data x.

Figure 2:
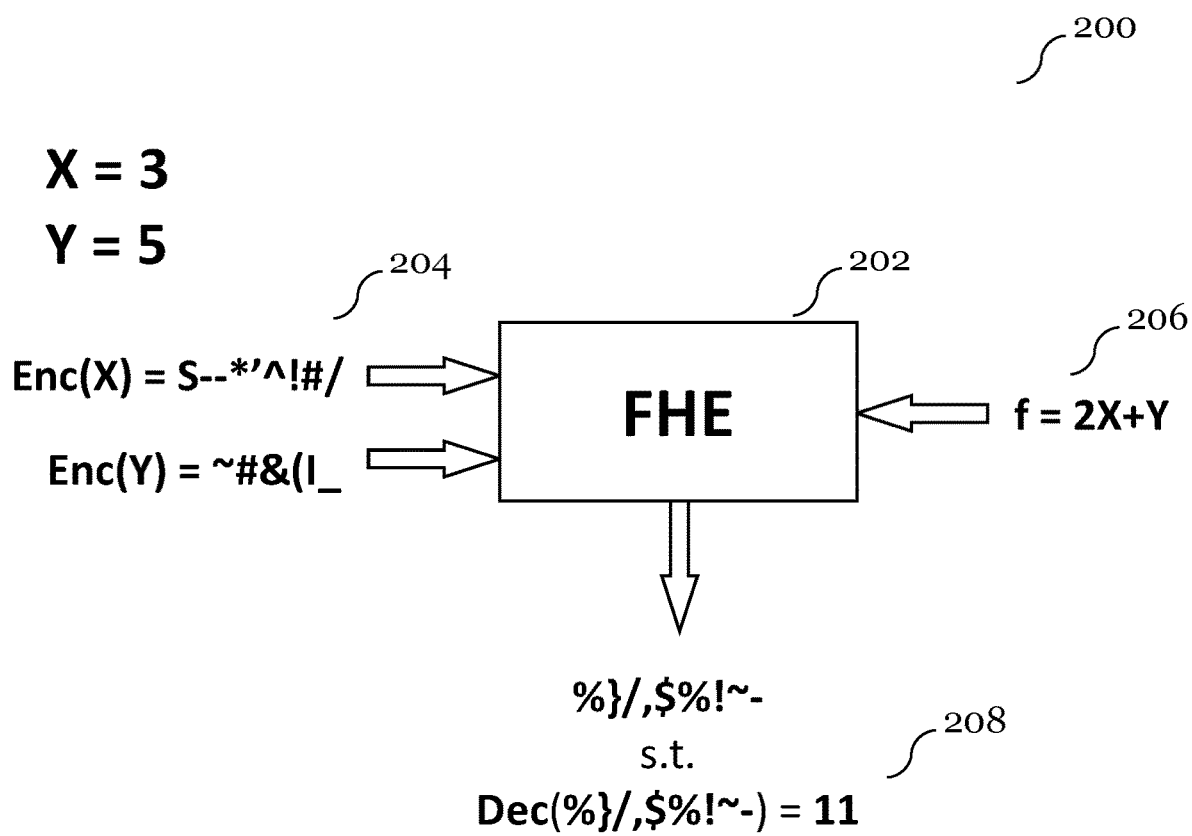
FIG. 2 shows an illustration of data in plaintext space and in ciphertext space, and how fully homomorphic encryption (FHE) acts on these data.

FIG. 2 shows an illustration 200 of data in plaintext space and in ciphertext space, and how fully homomorphic encryption (FHE) 202 acts on these data. For example, X=3 and Y=5 may be input data in plaintext space. These data may be encrypted to provide encrypted input data 204 in ciphertext space, for example Enc(X)=S—*¡^!#/ and Enc(Y)=~#&(I_. FHE module 202 may take the encrypted input data 204 and a function f 206, for example f=2X+Y, and may compute an encrypted result 208 based on the encrypted input data 204 and the function f 206. The FHE module 202 may compute Enc(f(2X+Y))=%}/,$%!~- based on the function f 206 and the encrypted input data 206, for example Enc(X) and Enc(Y). Decryption of the encrypted result may yield the plaintext space result (in other words, the decrypted result). It will be understood that the function f 206 is identical in plaintext space and ciphertext space. In other words, fully homomorphic encryption (FHE) enables computing on encrypted data.

Figure 3:
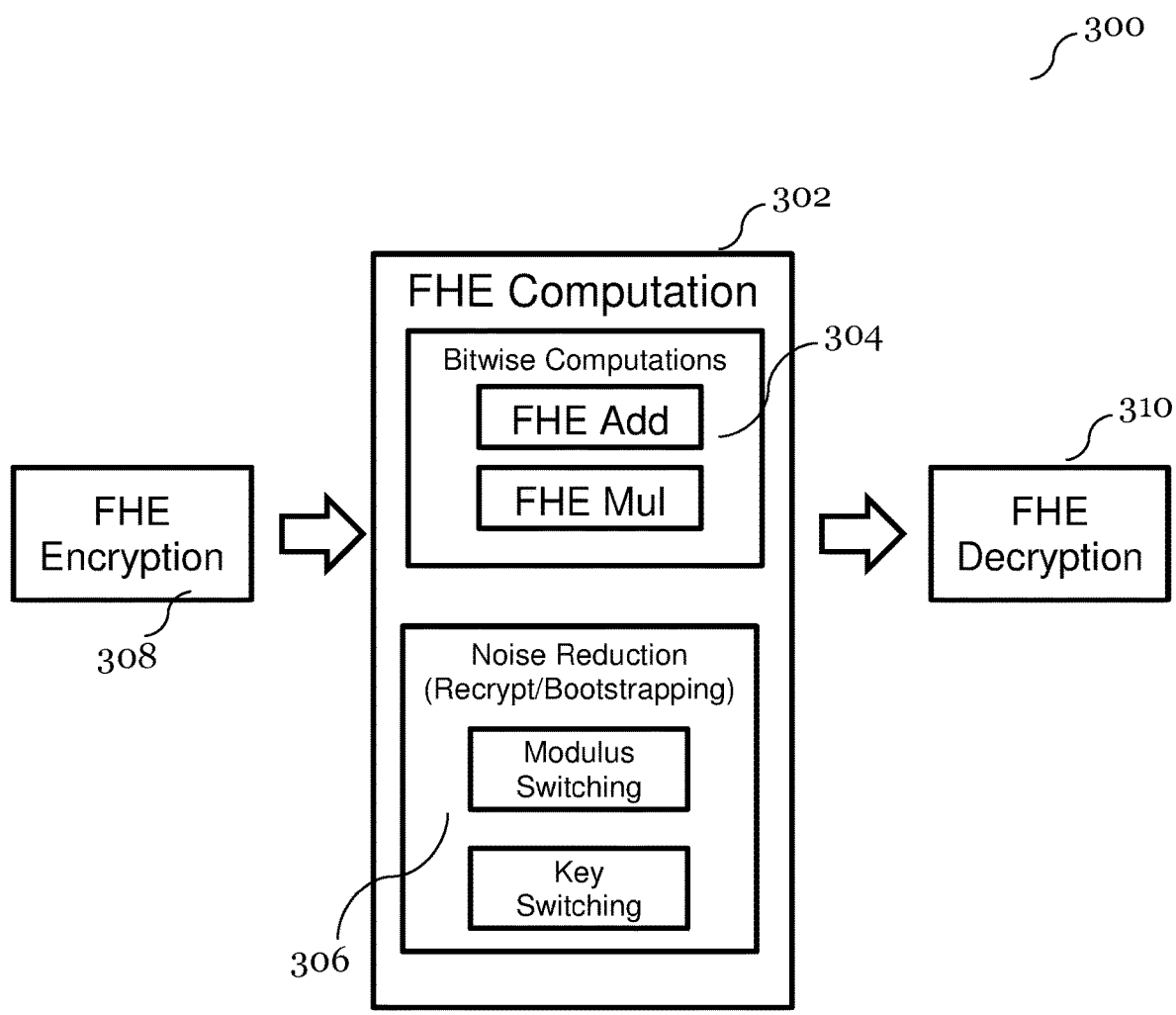
FIG. 3 shows an illustration of an FHE architecture.

FIG. 3 shows an illustration 300 of an FHE architecture. FHE Encryption module 308 may encrypt data, which may be processed by FHE computation module 302, and the processing results may be decrypted by FHE decryption module 310. The FHE computation module 302 may include a bitwise computations module 304, which may provide modules for FHE addition and FHE multiplication, and a noise reduction submodule 306 (for example for recrypting or bootstrapping), which may provide modules for modulus switching and key switching.

A principle in constructions of FHE is hiding plaintext data with relatively small noise. This noise may be completely filtered out by decryption given that it is under a certain level. Although one may compute on encrypted data in this scheme, the noise increases with each homomorphic evaluation until it exceeds workable amount at some point and the decryption fails to recover the plaintext results.

To control the noise growth, the recryption method may take as input: 1) an encryption of a worn-out ciphertext, i.e., it has large noise, and 2) an encryption of the decryption key. The recrypting portion of the noise reduction submodule 306 may evaluate homomorphically the decryption circuit using the encrypted ciphertext and encrypted decryption key to remove the inner encryption and outputs a substitute ciphertext (i.e., it encrypts the same plaintext) with less noise that allows extra operations to be performed homomorphically.

Another technique to reduce the noise growth may be modulus switching. The modulus switching portion of the noise reduction submodule 306 may replace the ciphertext coefficient modulus by a smaller modulus that still keeps the original data intact but reduces the noise level by a defined factor.

The key switching portion of the noise reduction submodule 306 may be used for mainly two purposes: 1) reducing the ciphertext size and 2) reducing the noise growth after homomorphic multiplication.

FHE involves arithmetic with very big polynomials. According to various embodiments, discrete Galois transform (DGT) like proposed by Crandall may be generalized to work with arbitrary primes. Arbitrary primes may be preferred since some primes offer efficient modulo operations (for example Solinas primes). Crandall suggests using Mersenne primes, which are prime numbers that are one less than a power of two, and which support Gaussian arithmetic and offer efficient modulo operations; however, the largest Mersenne prime that fits in a 64-bit machine word is $2^{61}-1$, and this prime wastes 3 bits which affects the maximum convolution value that can be computed.

With a prime number p, a Galois Field $GF(p^2)$ may be defined, which is composed by adjoining $GF(p)$ with $i=\sqrt{-1}$. If $p\equiv 1 \bmod 4$, then $i\in Z_p$ and thus $GF(p^2)$ contains only p integers. If $p\equiv 3 \bmod 4$, then $i\notin Z_p$ and thus $GF(p^2)$ contains $p^2$ Gaussian integers. According to various embodiments, $p\equiv 1 \bmod 4$ may be used, and i may not be replaced by its equivalent in $Z_p$, and Gaussian arithmetic may be performed as usual. Crandall's DGT method may work if an n/2-th primitive root of i can be found in $GF(p^2)$.

A first method for finding a Gaussian integer $h\in GF(p^2)$ s.t. $h^{n/2}\equiv i \bmod p$ may be as follows:

h=a+bi where a, $b\in GF(p)$.

$(a+bi)^{n/2}\equiv i \bmod p$.

Using binomial expansion, find a, b.

However, this first method may be inefficient even using a highly optimized implementation, for example a highly optimized Mathematica script. For example, finding $2^{14}$-th primitive root of i (mod 0xffffffff00000001) takes 156.45 hours on a standard computer and may require 33 GB of memory.

According to various embodiments, a second method for finding a Gaussian integer $h\in GF(p^2)$ s.t. $h^{n/2}\equiv i \bmod p$ may be provided as follows:

Factoring the prime into two Gaussian integers, $f_0$, $f_1$.

Finding a generator in each cyclic group of the factors.

Finding h in each group.

Combining both roots using the Chinese remainder theorem.

With this second method, finding $2^{16}$-th primitive root of i (mod 0xffffffff00000001) takes less than a second on a standard computer.

Figure 4:
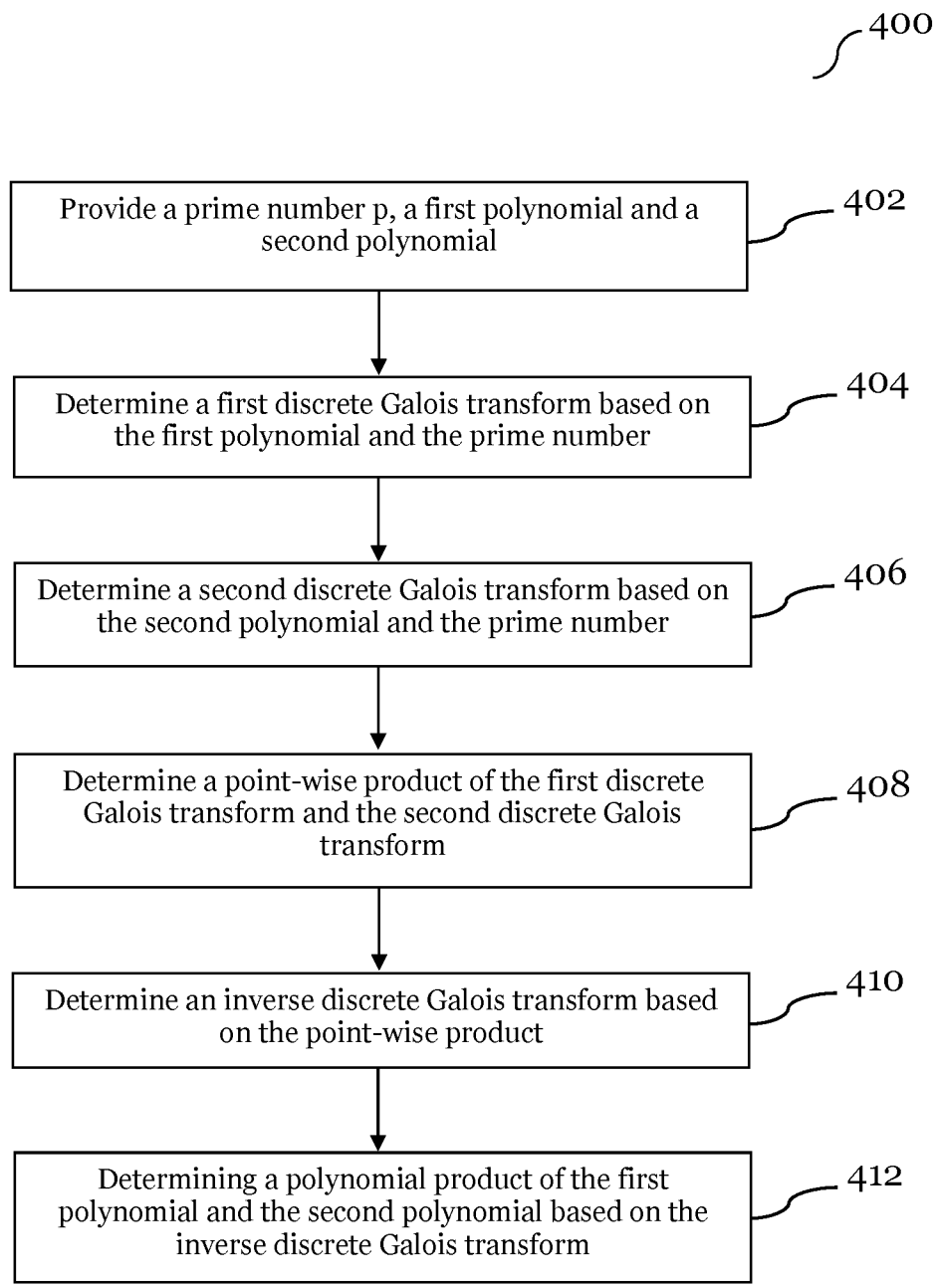
FIG. 4 shows a flow diagram illustrating a multiplication method according to various embodiments.

FIG. 4 shows a flow diagram 400 illustrating a multiplication method according to various embodiments. At step 402, a prime number p, a first polynomial and a second polynomial may be provided. At step 404, a first discrete Galois transform may be determined based on the first polynomial and the prime number. At step 406, a second discrete Galois transform may be determined based on the second polynomial and the prime number. At step 408, a point-wise product of the first discrete Galois transform and the second discrete Galois transform may be determined. At step 410, an inverse discrete Galois transform may be determined based on the point-wise product. At step 412, a polynomial product of the first polynomial and the second polynomial may be determined based on the inverse discrete Galois transform.

The multiplication method may be a multiplication method in $\mathbb{Z}[x]/\langle x^n+1 \rangle$, where $n=2^k$ and $k \in \mathbb{Z}$. p may be a prime number for which for which $p \equiv 3 \pmod 4$. p may be a prime number for which for which $p \equiv 1 \pmod 4$.

The multiplication method may further include determining a folding of the first polynomial, and determining a folding of the second polynomial, wherein the first discrete Galois transform is determined based on the folding of the first polynomial, and wherein the second discrete Galois transform is determined based on the folding of the second polynomial.

The multiplication method may further include: determining a twist of the folding of the first polynomial based on the prime number, and determining a twist of the folding of the second polynomial based on the prime number, wherein the first discrete Galois transform is determined based on the twist of the folding of the first polynomial, and wherein the second discrete Galois transform is determined based on the twist of the folding of the second polynomial. The multiplication method may further include removing twisting from the point-wise product after the inverse discrete Galois transform. The multiplication method may further include unfolding the point-wise product after the inverse discrete Galois transform with the twisting removed.

The multiplication method may further include determining a Galois field $GF(p^2)$ based on the prime number p. The multiplication method may further include determining a plurality of roots in the Galois field $(p^2)$, wherein the first discrete Galois transform and the second discrete Galois transform are determined based on the plurality of roots. The plurality of roots may include a root of unity and a root of an imaginary unit (wherein the square of the imaginary unit equals −1). The plurality of roots may include an n/2-th primitive root of unity and an n/2-th primitive root of an imaginary unit, wherein n is an integer number.

According to various embodiments, a non-transitory computer-readable medium may be provided. The non-transitory computer-readable medium may include instructions which, when executed by a processor, make the processor perform the multiplication method as described above.

Figure 5:
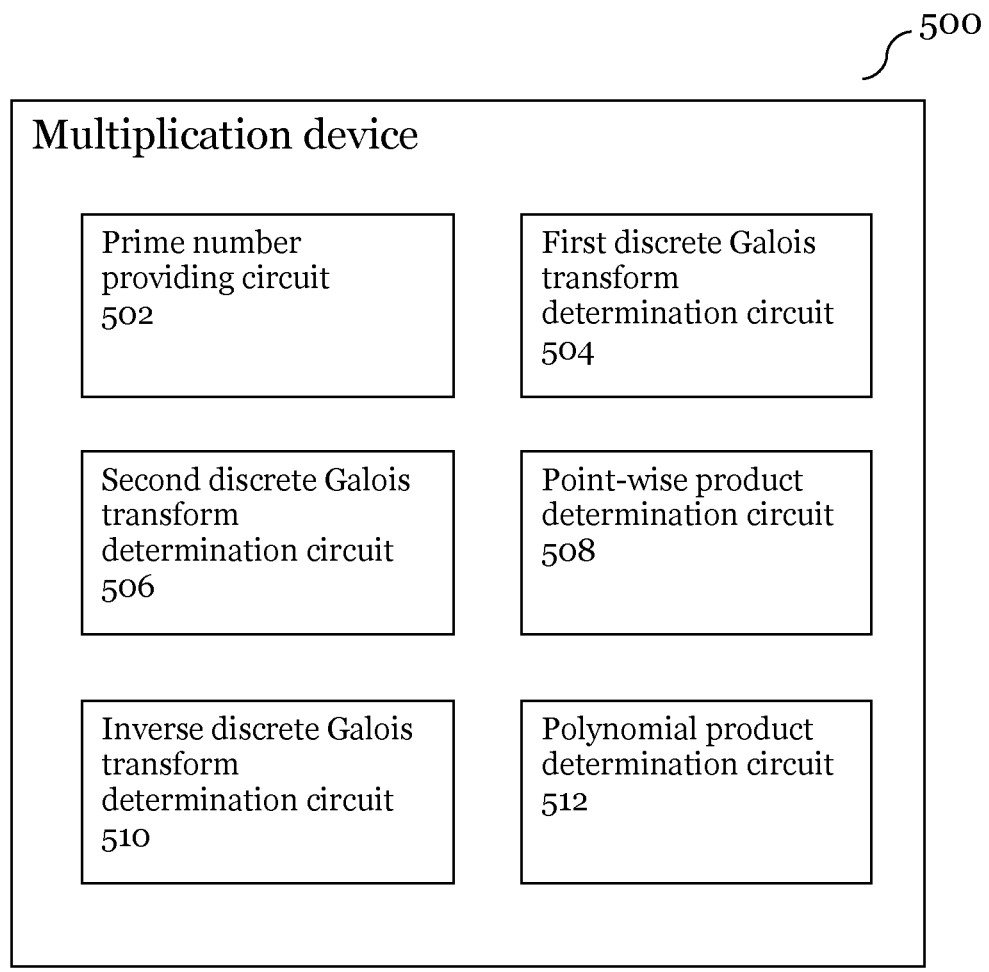
FIG. 5 shows a multiplication device according to various embodiments.

FIG. 5 shows a multiplication device 500 according to various embodiments. The multiplication device 500 may include a prime number providing circuit 502 configured to provide a prime number p, a first polynomial and a second polynomial. The multiplication device 500 may further include a first discrete Galois transform determination circuit 504 configured to determine a first discrete Galois transform based on the first polynomial and the prime number. The multiplication device 500 may further include a second discrete Galois transform determination circuit 506 configured to determine a second discrete Galois transform based on the second polynomial and the prime number. The multiplication device 500 may further include a point-wise product determination circuit 508 configured to determine a point-wise product of the first discrete Galois transform and the second discrete Galois transform. The multiplication device 500 may further include an inverse discrete Galois transform determination circuit 510 configured to determine an inverse discrete Galois transform based on the point-wise product. The multiplication device 500 may further include a polynomial product determination circuit 512 configured to determine a polynomial product of the first polynomial and the second polynomial based on the inverse discrete Galois transform.

p may be a prime number for which for which $p \equiv 3 \pmod 4$. p may be a prime number for which for which $p \equiv 1 \pmod 4$.

The multiplication device may further include a folding circuit configured to determine a folding of the first polynomial and a folding of the second polynomial. The first discrete Galois transform determination circuit 504 may be configured to determine the first discrete Galois transform based on the folding of the first polynomial. The second discrete Galois transform determination circuit 506 may be configured to determine the second discrete Galois transform based on the folding of the second polynomial. The multiplication device may further include a twisting circuit configured to determine a twist of the folding of the first polynomial based on the prime number and a twist of the folding of the second polynomial based on the prime number. The first discrete Galois transform determination circuit 504 may be configured to determine the first discrete Galois transform based on the twist of the folding of the first polynomial. The second discrete Galois transform determination circuit 506 may be configured to determine the second discrete Galois transform based on the twist of the folding of the second polynomial.

The multiplication device may further include a twist removing circuit configured to remove twisting from the point-wise product after the inverse discrete Galois transform. The multiplication device may further include an unfolding circuit configured to unfold the point-wise product after the inverse discrete Galois transform with the twisting removed. The multiplication device may further include a Galois field determination circuit configured to determine a Galois field $GF(p^2)$ based on the prime number p. The multiplication device may further include a roots determination circuit configured to determine a plurality of roots in the Galois field $(p^2)$. The first discrete Galois transform and the second discrete Galois transform may be determined based on the plurality of roots. The plurality of roots may include a root of unity and a root of an imaginary unit. The plurality of roots may include an n/2-th primitive root of unity and an n/2-th primitive root of an imaginary unit.

In the following, a more formal description of the mathematical aspects of various embodiments will be described. Basic concepts in convolution theory, DGT, and their relation to polynomial multiplication will be described. A formal representation of the problem statement introducing notations will be given.

Capital letters are used to refer to sets, and small letters are used for elements of a set. As usual, $\mathbb{Z}$, $\mathbb{Q}$, $\mathbb{R}$ and $\mathbb{C}$ denote integer numbers, rational numbers, real numbers, and complex numbers, respectively. $\lceil \ \rceil, \lfloor \ \rfloor, \lfloor \ \rceil$ denote round up, round down, and round to nearest integer, respectively. Unless otherwise stated, $\mathbb{Z}_q$ represents integer modulo q in the range of $$\{\lceil -\tfrac{q}{2} \rceil, \ldots, \lfloor \tfrac{q-1}{2} \rfloor\}.$$

Vector notation is used to represent polynomials, for instance polynomial a(x) of degree less than n may be represented as: $a=[a_0, a_1, \ldots, a_{n-1}]$, where $a_i$ is the i-th coefficient of a(x). Following Fourier transformation representation convention, transformed vectors are represented by capitalizing the vector's symbol.

In the following, polynomial multiplication in $\mathbb{Z}_q[x]/\langle x^n+1\rangle$ will be described.

Let $n, q \in \mathbb{Z}^+$, such that n is a power of 2. Let R denote the ring $\mathbb{Z}/\langle x^n+1\rangle$, being the set of polynomials with integer coefficients of degree less than n, and $R_q$ denote the ring $\mathbb{Z}_q/\langle x^n+1\rangle$, being the set of polynomials modulo both $(x^n+1)$ and q. Suppose $a(x), b(x) \in R_q$ of degree less than n, and we need to compute their product $c(x)=a(x)b(x) \in R_q$ of degree less than n and with coefficients in $\mathbb{Z}_q$. It is to be noted that reduction of a polynomial modulo q can be done in line time O(N) by a single pass and reducing each coefficients modulo q. Thus, we may only focus on methods that produce the product in R. As used herein, the word reduction may also refer to reducing a polynomial modulo another polynomial.

Classic methods, e.g. schoolbook multiplication followed by polynomial reduction like long division require $O(N^2)$ to compute c(x). Equation 1 shows how the product can be computed without reduction:

$$\bar{c}(x) = a(x)b(x) = \sum_{i=0}^{n-1}\sum_{j=0}^{n-1} a_i b_j x^{i+j} \tag{1}$$

Still a classical polynomial division method is required to reduce $\bar{c}(x)$ to c(x) in $R_q$. However, since we are using the special irreducible polynomial $f(x)=x^n+1$, division can be forgone as follows: since $x^n+1 \equiv 0 \pmod{x^n+1}$, then $x^n \equiv -1 \pmod{x^n+1}$. This allows us to replace any $x^n$ by $-1$ in equation 1 that results in $\bar{c}(x)$ reduced in $R_q$ for free. This stratagem may also be referred to as the negative wrapped or negcyclic convolution and may be formally expressed in equation 2:

$$c(x) = a(x) \cdot b(x) = \sum_{i=0}^{n-1}\sum_{j=0}^{n-1} (-1)^{\lfloor \frac{i+j}{n} \rfloor} a_i b_j x^{(i+j \bmod n)} \tag{2}$$

In other words, equation 2 states that polynomial multiplication in $R_q$ can be computed via negacyclic convolution.

As described above, multiplication may be performed via convolution. In fact, equation 1 give the formal definition of integer convolution of two signals, where a signal is composed using the polynomial coefficients. Furthermore, equation 2 refers to the definition of negacyclic convolution of a and b.

The convolution theorem states that the Fourier transform of a convolution can be computed via point-wise (dyadic) product of the Fourier transform of the two signals at hand. This may formally be expressed in equation 3:

$$a*b = \mathcal{F}^{-1}(\mathcal{F}(a), \mathcal{F}(b)) \tag{3}$$

Where * denotes the convolution operator. $\mathcal{F}$ and $\mathcal{F}^{-1}$ refer to the Fourier transform and its inverse respectively. As described herein, it may be dealt with polynomials of finite coefficients, and only discrete signals are addressed; therefore, $\mathcal{F}$ refers to the discrete Fourier transform (DFT).

It is well known that DFT and its inverse can be computed in O(n log n) via any fast Fourier transform (FFT)/Inverse Fourier transform (IFFT) method. Thus, the overall time complexity of convolving two signals of length n is equal to 2 FFTs and 1 IFFT of length n, totaling at O(n log n). This is an important result as a basis for a large class of fast multiplication methods.

Discrete Galois transform (DGT) is an adapted version of DFT over the Galois Field $GF(p^2)$, where p is prime, as proposed by Crandall. Although DGT requires that $p \equiv 3 \pmod{4}$, i.e. Gaussian primes, i.e. primes that support Gaussian integer arithmetic known as Gaussian primes, we show that the same transform can be applied using primes that are $p \equiv 1 \pmod{4}$, i.e. non-Gaussian primes. In fact, any prime number belongs to one of those sets (Gaussian or non-Gaussian).

An element $u \in GF(p^2)$ can be represented as $u_{re}+u_{im}$, where $u_{re}, u_{im} \in \mathbb{Z}_p$, and $i=\sqrt{-1}$ is the imaginary unit. These elements are also known as Gaussian integers. Arithmetic with Gaussian integers are similar to complex number arithmetic with a reduction modulo p for the real and imaginary parts. The DGT and its inverse of signal $x=\{x_0, x_1, \ldots, x_{n-1}\}$ of length n and $x_i \in GF(p^2)$ are shown in equations 4 and 5, respectively:

$$X_k = \sum_{j=0}^{n-1} x_j g^{-jk} \pmod{p} \tag{4}$$

$$x_k = n^{-1} \sum_{j=0}^{n-1} X_j g^{jk} \pmod{p} \tag{5}$$

where g is a primitive n-th root of unity in $GF(p^2)$. It will be noticed that there is a similarity between the DGT and DFT to a small degree, and DGT and number theoretic transform (NTT) to a greater degree.

DGT has some advantageous properties such as: 1) negacyclic convolution of two n-point signals can be computed via (n/2)-point DGT/IDGT, 2) some Gaussian primes provide faster modulo operations such as Mersenne primes, 3) DGT supports lengths≤p+1 due to the large size of $GF(p^2)$ multiplicative group and the simplicity of finding primitive roots of unity.

Despite these beneficial features, DGT required complex number arithmetic, which may hinder its usage over other methods. However, experiments according to various embodiments show that DGT can still achieve good performance and outperform other methods.

In the following, negacyclic convolution via DGT will be described.

Based on the notations and concepts of the structure of the polynomial ring of interest, convolution, and DGT described above, polynomial multiplication in $\mathbb{Z}_q[x]/\langle x^n+1\rangle$ via DGT may be provided, like shown in the following table of method 1. It can be easily seen that the method runs asymptotically in time complexity similar to DGT/IDGT. If fast Fourier-like methods are used to compute them, the overall complexity of method 1 is O(n log n).

Method 1 Polynomial multiplication in $R_q$ via the DGT

Let $R_q$ be the ring, $\mathbb{Z}_q[x]/\langle x^n+1\rangle$, $q \in \mathbb{Z}^+$ and n is a power of 2. Let $\hat{p} \in \mathbb{Z}^+$ be a prime, g be a primitive n/2-th root of unity in $GF(\hat{p}^2)$, and $h \in \mathbb{Z}[i]$ be an n/2-th root of i in $GF(\hat{p}^2)$. Let a(x), b(x), c(x) $\in$ R be polynomials of degree less than n with integer coefficients $\in [0, q \leq \lfloor|\sqrt{\hat{p}/(2n)}|\rfloor]$.
Input: a(x), b(x), g, $g^{-1}$, h, $h^{-1}$, n, $n^{-1}$, $\hat{p}$ -continued Method 1 Polynomial multiplication in $R_q$ via the DGT Output: $c(x) = a(x), b(x) \pmod{q, x^n + 1}$
Precompute:
    $g^j, g^{-j}, h^j, h^{-j} \pmod{\hat{p}}$, where $j = 0, \ldots, n/2 - 1$
Initialize:
    fold over input signals:
        $a'_j = a_j + ia_{j+n/2}$
        $b'_j = b_j + ib_{j+n/2}$
    Twist the folded signals:
        $\bar{a}'_j = a'_j h^j \pmod{\hat{p}}$
        $\bar{b}'_j = b'_j h^j \pmod{\hat{p}}$
    Compute n/2 DGT:
        $A = DGT(\bar{a}')$
        $B = DGT(\bar{b}')$
    Point-wise multiplication:
        $C_j = A_j \cdot B_j \pmod{\hat{p}}$
    Compute n/2 IDGT:
        $\bar{c}' = IDGT(C)$
    Remove twisting factors:
        $c'_j = \bar{c}'_j h^{-j} \pmod{\hat{p}}$
    Unfold output signal:
        $c_j = Re(c'_j)$    ▷ Re returns the real part
        $c_{j+n/2} = Im(c'_j)$▷ Im returns the imaginary part
return c Method 1 has some details to be considered carefully. First, the coefficients of the product signal must be representable (mod $\hat{p}$), i.e. lie in $$\left\{\left\lceil -\frac{\hat{p}}{2}\right\rceil, \left\lfloor \frac{\hat{p}}{2}\right\rfloor\right\},$$

hence the condition of having the coefficients of input polynomials in $[0, q \leq \lfloor\sqrt{\hat{p}/(2n)}\rfloor]$. If the polynomials of interest have coefficients greater than this bound, one can represent the polynomials in Residual Numbering System (RNS), perform the multiplication on the corresponding polynomial residue using DGT method, and finally reconstruct the final polynomial using CRT (Chinese remainder theorem) reconstruction. This may be a common approach used to do arithmetic on large numbers/polynomials. According to various embodiments, it may be dealt with small coefficients, such that CRT is not required.

It is to be noted that q and p are to be distinguished. q is a bound on polynomial coefficients to limit coefficient growth. Also, q needs not be a prime number. On the other hand, $\hat{p}$, which has to be prime, defines the structure $GF(\hat{p}^2)$. It is used to compute DGT/IDGT in $GF(\hat{p}^2)$. According to various embodiments, $\hat{p}$ may be a 64-bit special Solinas prime that offers efficient modulo reduction. If q happens to be greater than $\hat{p}$, it should be factored into a set of co-prime numbers $\{p_0, p_1, \ldots, p_{i-1}\}$ and RNS representation and CRT reconstruction can be used.

An important implementation issue is the modulo representation. In most programming languages, (mod $\hat{p}$) operation returns an integer E $[0, \ldots, \hat{p}-1]$. There is no problem of computing DGT using this range, but an extra treatment step would be required to scale the result back in $$\left\{\left\lceil -\frac{\hat{p}}{2}\right\rceil, \left\lfloor \frac{\hat{p}-1}{2}\right\rfloor\right\}.$$

This is an important caveat especially if one uses RNS/CRT to deal with polynomials with large coefficients. One must first get the negacyclic convolution result in $$\left\{\left\lceil -\frac{\hat{p}}{2}\right\rceil, \left\lfloor \frac{\hat{p}-1}{2}\right\rfloor\right\},$$

then reduction modulo the RNS moduli can be used safely. One must also pay attention that the prime $\hat{p}$ used in DGT does not belong to the RNS moduli.

Although the DGT method as proposed originally requires that $p \equiv 3 \pmod 4$, i.e. primes that support Gaussian arithmetic, and which may be referred to as Gaussian primes, according to various embodiments, it may be worked with not necessarily Gaussian primes, as described below.

The restriction to Gaussian primes may be to reduce the difficulty of finding primitive roots of unity and of $i = \sqrt{-1}$), which are required in the computation. Moreover, working with some Gaussian primes such as Mersenne primes, makes finding primitive roots even simpler due to the Creutzburg and Tasche theorem, which gives a closed-form formula to find the roots. Furthermore, the Galois field $GF(p^2)$ with these primes is will defined and has $p^2$ elements written in the form x+iy.

On the other hand, if we work with $p \equiv 1 \pmod 4$, $GF(p^2)$ is not defined properly, since $\sqrt{-1} = i$, is an element of $GF(p)$ and the set we obtain by adjoining $\mathbb{Z}_p$ and $i = \sqrt{-1}$) has only p elements and not $p^2$. Although the algebraic structure is not well-defined, this has no effect on the DGT multiplication method as long as the ordinary complex numbers arithmetic are applied modulo p.

Working with any prime is advantageous at least for the following reasons: 1) one does not have to restrict the search space while searching for the primes of interest in computing DGT, 2) some primes provide efficient modulo operations and may not be $\equiv 3 \pmod 4$ such as some Solinas primes. If one chooses to use Mersenne primes, the most suitable prime for current 64-bit machines is $2^{61}-1$, but it wastes 3 bits which in turn reduces the maximum value of convolution supported. In fact, there is a special 64-bit Solinas prime, p=0xFFFFFFFF00000001, that best serves 64-bit machines in computing DGT and offers efficient modulo operation.

When working with primes that are not $\equiv 3 \pmod 4$, finding primitive roots of unity and roots of $i = \sqrt{-1}$) may be cumbersome. It will be described how to efficiently determine those roots further below.

Furthermore, it is to be noted that DGT may be computed over the complex numbers domain. This may be advantageous, because finding primitive roots of unity or $i = \sqrt{-1}$) is trivial. Also, FFT may be computed efficiently.

DGT operation and its inverse look similar to DFT and its inverse (IDFT). In fact, DFT can be thought of as an abstract transformation that may be applied in any algebraic structure that has well-defined primitive roots of unity and inverse of the transform length. This means that any efficient FFT data-path can be used to implement the DGT/IDGT as long as one respects the underlying domain arithmetic.

One important concept that may be taken into consideration while choosing the forward and inverse DGT methods is the bit-reversal scrambling procedure. Several FFT methods require data to be reordered in some way. Usually, this reordering is applied to obtain a proper order transform and reduce computation cost. However, since we only use FFT for polynomial evaluation and interpolation, proper order is not important if the inverse FFT took the reordering into consideration. In fact, if a decimation-in-frequency method was used for FFT and a decimation-in-time used for IFFT, bit-reversal may be avoided.

According to various embodiments, Gentleman-Sande FFT data-path may be used to compute the forward DGT. This may be advantageous at least for the following reasons: 1) Gentleman-Sande is a decimation-in-frequency method that requires bit-reversal at the end of computation; 2) the method is in-place, i.e. memory efficient; 3) data size is a power of 2 that is ideally suitable for Gentleman-Sande method. These properties make Gentleman-Sande ideally suitable for the forward DGT method according to various embodiments.

Method 2 shows the basic Gentleman-Sande method. Although bit reversal is not used, it is shown here for completeness. The method is adapted for work with Galois finite field $GF(\hat{p}^2)$. It will be understood that the Gentleman-Sande method is an example for a method for DGT, but various other methods may be used.

| Method 2 DGT via Gentleman-Sande |
|---|
| Let $\hat{p} \in \mathbb{Z}^+$ be a special prime = 0xFFFFFFFF00000001, $g \in \mathbb{Z}_{\hat{p}}$ be a primitive k-th root of unity. Let x be a folded signal of length k = $2^d$ composed of the original polynomial (of length $2^{d+1}$) coefficients. Elements of x are Gaussian integers $\in GF(\hat{p}^2)$.<br>Input: x, g, k, $\hat{p}$<br>Output: x = DGT(x)<br>Precompute:<br>  $g^j$ (mod $\hat{p}$), where j = 0, . . . , k - 1<br>Procedure:<br>for m = k/2; m ≥ 1; m = m/2 do<br>  for j = 0; j < m; j++ do<br>    a = $g^{(jk/(2m))}$<br>    for i = j; i < k; i+ = 2m do<br>      $x_i = x_i + x_{i+m}$ (mod $\hat{p}$)<br>      $x_{i+m} = a(x_i - x_{i+m})$ (mod $\hat{p}$)<br>bit-reverse(x)       ▷ can be avoided<br>return x |

The IDGT computation is similar to forward DGT, but requires an extra step of multiplying the resulting vector by a rescaling factor of $k^{-1}$(mod $\hat{p}$). Furthermore, the inverse of primitive k-th root of unity ($g^{-1}$) is used instead. It is to be noted that powers of $g^{-1}$ can be computed from powers of g since $g^{-i} \equiv g^{(k-i)(mod\ k)}$(mod $\hat{p}$). For IDGT, the Cooley-Tukey FFT data-path may be used, which is a decimation-in-time in-place FFT method. The method is adapted to work in $GF(\hat{p}^2)$. The method is shown in method 3. It will be understood that the Cooley-Tukey method is an example for a method for IDGT, but various other methods may be used.

| Method 3 IDGT via Cooley-Tukey |
|---|
| Let $\hat{p} \in \mathbb{Z}^+$ be a special prime = 0xFFFFFFFF00000001, $g^{-1} \in \mathbb{Z}_{\hat{p}}$ be the inverse of k-th primitive root of unity. Let x be a folded signal of length k = $2^d$ composed of the original polynomial (of length $2^{d+1}$) coefficients. Elements of x are Gaussian integers $\in GF(\hat{p}^2)$.<br>Input: x, $g^{-1}$, k, $\hat{p}$<br>Output: x = IDGT(x)<br>Precompute:<br>  $g^{-j}$ (mod $\hat{p}$), where j = 0, . . . , k - 1<br>Procedure:<br>bit-reverse(x)       ▷ can be avoided<br>for m = 1; m < k; m = 2m do<br>  for j = 0; j < m; j++ do<br>    a = $g^{(-jk/(2m))}$<br>    for i = j; i < k; i+ = 2m do<br>      $x_i = x_i + ax_{i+m}$ (mod $\hat{p}$)<br>      $x_{i+m} = x_i - ax_{i+m}$ (mod $\hat{p}$)<br>return x |

Both method 2 and method 3 are variants of radix-2 in-place fast Fourier transform methods and run asymptotically in O(n log n) with O(n) space complexity.

In the following, efficient methods to generate the primitive roots of $i=\sqrt{-1}$) in $GF(p^2)$, where p≡1 mode 4 will be described.

One important portion in applying the DGT multiplication method is finding k-th primitive roots of i. In general, finding these roots in a field other than C is not an easy procedure even for a super computer when the parameters are fairly large. The reason is that a trial and error approach is usually used to find them. If one however is using a Mersenne prime, these roots can be found easily thanks to the Creutzburg and Tasche theorem which gives a close form formula to calculate these roots. Since the prime according to various embodiments is not a Mersenne prime, the prime according to various embodiments had to be found in a different way, for example using a trial and error approach. Although the prime according to various embodiments is not very large, finding primitive roots of i for large k is not a trivial task. A highly optimized Mathematica script was developed to solve the equation $z^k \equiv i$(mod $\hat{p}$) where $z \in GF(\hat{p}^2)$. The basic idea is to perform binomial expansion and solve the resulting two equations simultaneously. This approach was not efficient. For instance, finding $2^{14}$-th primitive root of i(mod $\hat{p}$) takes 156.45 hours and requires 33 GB of memory. Although one may argue that this task is not important as it is only performed once, a more efficient solution may be desired.

A much more efficient approach starts with the fact that $\hat{p}$ can be factored in the Gaussian integer domain into two Gaussian integers, namely $f_0$=65536+4294967295i and $f_1$=65536 4294967295i. The multiplicative group of Gaussian integers modulo each factor forms a cyclic group of order $\hat{p}$−1. A generator in each group may then be found, for example $\varsigma_j$, where j∈{0,1} by generating a random element and checking if it has an order of $\hat{p}$−1. Provided that a generator was found, one can find a k-th primitive root of i as follows:

$$\varsigma_j^{\frac{\hat{p}-1}{4k}} \text{ (mod } f_j).$$

Finally, the CRT may be used to reconstruct the root in $GF(\hat{p}^2)$.

Using the second approach, primitive k-th roots of i modulo $\hat{p}$, where k∈{0.25, 0.5, 1, 2, . . . , 64}*$2^{10}$ may be found in less than a second. For completeness, Table 1 shows instances of k-th primitive roots of i(mod $\hat{p}$) in GF($\hat{p}^2$).

TABLE 1

Primitive k-th roots of i (mod $\hat{p}$),
where $\hat{p}$ = 0xFFFFFFFF00000001

| $k/2^{10}$ | Root of i |
|---|---|
| 0.25 | 1100507988529617178 + 130613734846468140047i |
| 0.5 | 5809945479226292735 + 4344400649288295733i |
| 1 | 19733882440864277726 + 10274180581472164772i |
| 2 | 2796647310976247644 + 10276259027288899473i |
| 4 | 1838446843991 + 11906871093314535013i |
| 8 | 350701160942 + 2376526094797987232i |
| 16 | 6583264258929468914 + 6843633496861054794i |
| 32 | 8792747750079974660 + 5349516358062242429i |
| 64 | 4079625552322729221 + 5648961845066732578i |

For multiplication of Gaussian integers in GF($\hat{p}^2$), the Karatsuba method may be used, which may compute the complex-like multiplication using 3 multiplications and 4 additions/subtractions (mod $\hat{p}$) instead of the schoolbook method that requires 4 multiplications and 2 additions/subtractions (mod $\hat{p}$).

The prime that is used according to various embodiments has some advantageous properties that allow performing reduction modulo $\hat{p}$ efficiently. Since the size of $\hat{p}$ is 64-bit, an element $\in \mathbb{Z}_{\hat{p}}$ is at most a 64-bit number. Hence, it only need to be cared about reducing a 128-bit number resulting from multiplying two 64-bit numbers. The prime number that is used according to various embodiments is $\hat{p}$=0xFFFFFFFF0000001 which may be expressed as $\hat{p}=2^{64}-2^{32}+1$. Following Solinas method, starting with $\hat{p}=f(2^k)=t^2-t+1$ where k=32, the reduction matrix can be found to equal $$X = \begin{bmatrix} -1 & 1 \\ -1 & 0 \end{bmatrix}.$$

This allows computation of the reduction of a 128-bit number modulo $\hat{p}$ by performing addition and subtractions of its four 32-bit words. Method 4 shows how this may be done using only shifts, additions, and subtractions. It will be understood that the Solinas method is an example for a method for reduction, but various other methods may be used.

---

Method 4 Efficient reduction modulo $\hat{p}$

```
Let a ∈ ℤ⁺ be a 128-bit integer, and prime p̂ =
0xFFFFFFFF00000001
Input: a, p̂
Output: b = a (mod p̂)
Procedure:
    ω₀ = a                    ▷ ωⱼ: 32-bit word
    ω₁ = a ≫ 32
    ω₂ = a ≫ 64
    ω₃ = a ≫ 96
    b = ((ω₂ + ω₁) ≪ 32) - ω₃ - ω₂ + ω₀
    return b                  ▷ b: 64-bit integer
```

---

Thus, it can be seen that devices and methods have been provided to overcome the problems of inefficient fully homomorphic encryption, for example by providing multiplication methods, non-transitory computer-readable media, and multiplication apparatuses. Such a multiplication method may include: providing a prime number p, a first polynomial and a second polynomial; determining a first discrete Galois transform based on the first polynomial and the prime number; determining a second discrete Galois transform based on the second polynomial and the prime number; determining a point-wise product of the first discrete Galois transform and the second discrete Galois transform; determining an inverse discrete Galois transform based on the point-wise product; and determining a polynomial product of the first polynomial and the second polynomial based on the inverse discrete Galois transform. In various embodiments, any general prime number may be used (i.e. a prime number p for which p≡1 (mod 4), or a prime number p for which p≢1 (mod 4)). As such, the devices and methods according to various embodiments advantageously do work with any prime number, not necessarily Gaussian prime numbers only, which for example allows using Solinas primes that offer efficient modulo operation. Thus, the devices and methods according to various embodiments advantageously are more efficient than state-of-the-art software tools. Implementations of methods according to various embodiments may be provided on one or more CPUs (central processing units) and/or one or more GPUs (graphics processing unit).

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A homomorphic encryption method using at least one processor, the homomorphic encryption method comprising:
   receiving an input data; and
   homomorphically encrypting the input data to obtain a homomorphically encrypted data, including multiplying a first polynomial and a second polynomial associated with the input data,
   wherein said multiplying comprises:
      providing a prime number p;
      determining a first discrete Galois transform based on the first polynomial and the prime number;
      determining a second discrete Galois transform based on the second polynomial and the prime number;
      determining a point-wise product of the first discrete Galois transform and the second discrete Galois transform;
      determining an inverse discrete Galois transform based on the point-wise product; and
      determining a polynomial product of the first polynomial and the second polynomial based on the inverse discrete Galois transform.

2. The homomorphic encryption method of claim 1, wherein said multiplying is performed in $\mathbb{Z}_q / \mathbb{Z} x^n + 1 \mathbb{Z}$, where $n=2^k$ and $k \in \mathbb{Z}$.

3. The homomorphic encryption method of claim 1, wherein p is a prime number for which p≡3 (mod 4).

4. The homomorphic encryption method of claim 1, wherein p is a prime number for which p≡1 (mod 4).

5. The homomorphic encryption method of claim 1, further comprising:
   determining a folding of the first polynomial;
   determining a folding of the second polynomial,
   wherein the first discrete Galois transform is determined based on the folding of the first polynomial, and
   wherein the second discrete Galois transform is determined based on the folding of the second polynomial.

6. The homomorphic encryption method of claim 5, further comprising:
    determining a twist of the folding of the first polynomial based on the prime number;
    determining a twist of the folding of the second polynomial based on the prime number,
    wherein the first discrete Galois transform is determined based on the twist of the folding of the first polynomial, and
    wherein the second discrete Galois transform is determined based on the twist of the folding of the second polynomial.

7. The homomorphic encryption method of claim 1, further comprising:
    removing twisting from the point-wise product after the inverse discrete Galois transform.

8. The homomorphic encryption method of claim 7, further comprising:
    unfolding the point-wise product after the inverse discrete Galois transform with the twisting removed.

9. The homomorphic encryption method of claim 1, further comprising:
    determining a Galois field $GF(p^2)$ based on the prime number p.

10. The homomorphic encryption method of claim 9, further comprising:
    determining a plurality of roots in the Galois field $(p^2)$,
    wherein the first discrete Galois transform and the second discrete Galois transform are determined based on the plurality of roots.

11. The homomorphic encryption method of claim 10, wherein the plurality of roots comprise a root of unity and a root of an imaginary unit.

12. The homomorphic encryption method of claim 10, wherein the plurality of roots comprise an n/2-th primitive root of unity and an n/2-th primitive root of an imaginary unit.

13. A non-transitory computer-readable medium, comprising instructions which, when executed by a processor, make the processor perform a homomorphic encryption method comprising:
    receiving an input data; and
    homomorphically encrypting the input data to obtain a homomorphically encrypted data, including multiplying a first polynomial and a second polynomial associated with the input data,
    wherein said multiplying comprises:
        providing, a prime number p;
        determining a first discrete Galois transform based on the first polynomial and the prime number;
        determining a second discrete Galois transform based on the second polynomial and the prime number;
        determining a point-wise product of the first discrete Galois transform and the second discrete Galois transform;
        determining an inverse discrete Galois transform based on the point-wise product; and
        determining a polynomial product of the first polynomial and the second polynomial based on the inverse discrete Galois transform.

14. A homomorphic encryption device comprising:
    a memory; and
    at least one processor communicatively coupled to the memory and configured to:
    receive an input data; and
    homomorphically encrypt the input data to obtain a homomorphically encrypted data, including multiplying a first polynomial and a second polynomial associated with the input data,
    wherein said multiplying comprises:
        providing a prime number p;
        determining a first discrete Galois transform based on the first polynomial and the prime number;
        determining a second discrete Galois transform based on the second polynomial and the prime number;
        determining a point-wise product of the first discrete Galois transform and the second discrete Galois transform;
        determining an inverse discrete Galois transform based on the point-wise product; and
        determining a polynomial product of the first polynomial and the second polynomial based on the inverse discrete Galois transform.

15. The homomorphic encryption device of claim 14, wherein p is a prime number for which for which $p \equiv 3$ (mod 4).

16. The homomorphic encryption device of claim 14, wherein said multiplying further comprises:
    determining a folding of the first polynomial and a folding of the second polynomial,
    wherein said determining the first discrete Galois transform is based on the folding of the first polynomial, and
    wherein said determining the second discrete Galois transform is based on the folding of the second polynomial.

17. The homomorphic encryption device of claim 16, wherein said multiplying further comprises:
    determining a twist of the folding of the first polynomial based on the prime number and a twist of the folding of the second polynomial based on the prime number,
    wherein said determining the first discrete Galois transform is based on the twist of the folding of the first polynomial, and
    wherein said determining the second discrete Galois transform is based on the twist of the folding of the second polynomial.

18. The homomorphic encryption device of claim 14, wherein said multiplying further comprises:
    removing twisting from the point-wise product after the inverse discrete Galois transform.

19. The homomorphic encryption device of claim 18, wherein said multiplying further comprises:
    unfolding, the point-wise product after the inverse discrete Galois transform with the twisting removed.

20. The homomorphic encryption device of claim 19, wherein said multiplying further comprises:
    determining a plurality of roots in a Galois field $(p^2)$;
    wherein the first discrete Galois transform and the second discrete Galois transform are determined based on the plurality of roots.

* * * * *